United States Patent [19]
Holshouser

[11] Patent Number: 6,016,126
[45] Date of Patent: Jan. 18, 2000

[54] NON-PROTRUDING DUAL-BAND ANTENNA FOR COMMUNICATIONS DEVICE

[75] Inventor: Howard E. Holshouser, Efland, N.C.

[73] Assignee: Ericsson Inc., Research Triangle Park, N.C.

[21] Appl. No.: 09/087,598

[22] Filed: May 29, 1998

[51] Int. Cl.[7] ...................................................... H01Q 1/24
[52] U.S. Cl. ............................ 343/702; 343/729; 455/90
[58] Field of Search ............................ 343/702, 700 MS, 343/793, 803, 804, 866, 741, 729; 455/90; H01Q 1/24

[56] References Cited

U.S. PATENT DOCUMENTS

| | | | |
|---|---|---|---|
| 4,613,868 | 9/1986 | Weiss | 343/700 MS |
| 5,561,437 | 10/1996 | Phillips et al. | 343/702 |
| 5,576,718 | 11/1996 | Buralli et al. | 343/700 MS |
| 5,710,987 | 1/1998 | Paulick | 343/702 |

FOREIGN PATENT DOCUMENTS

| | | |
|---|---|---|
| 0714151A1 | 5/1996 | European Pat. Off. . |
| 0790663A1 | 8/1997 | European Pat. Off. . |
| 0825669A2 | 2/1998 | European Pat. Off. . |
| 2293275 | 3/1996 | United Kingdom . |
| 2317994 | 4/1998 | United Kingdom . |
| WO94/19873 | 9/1994 | WIPO . |
| WO95/24746 | 9/1995 | WIPO . |
| WO97/47054 | 12/1997 | WIPO . |

*Primary Examiner*—Hoanganh Le
*Attorney, Agent, or Firm*—Myers Bigel Sibley & Sajovec, P.A.

[57] ABSTRACT

Dual-band antennas include first and second radiating elements configured to be enclosed within a radiotelephone between a keypad and a top housing and to occupy available space existing around the perimeter of the keypad and/or between the keys of a keypad. First and second coplanar radiating elements are maintained in adjacent spaced-apart relationship with a circuit board underlying the keypad. The underlying circuit board serves as a ground plane for directing radiation from the antenna outwardly in a direction normal to the circuit board.

23 Claims, 5 Drawing Sheets

NON-PROTRUDING DUAL-BAND ANTENNA FOR COMMUNICATIONS DEVICE

FIELD OF THE INVENTION

The present invention relates generally to antennas, and more particularly to antennas used with communication devices.

BACKGROUND OF THE INVENTION

Communication devices, such as radiotelephones, are being developed for users to wear on their wrists, around their waists and in their pockets. Primary antennas that protrude from these devices may be undesirable because they may interfere with a user's comfort. Furthermore, because of the relative closeness of a primary antenna to a user's body, radio frequency (RF) signals may be blocked. Also, conventional primary antennas may not radiate outwardly with sufficient gain to overcome the close proximity of a user. Accordingly, radiotelephones may not function properly when in close proximity to a user during operation.

Primary antennas for radiotelephones may not function adequately when a user is moving during operation of the radiotelephone. Close proximity to objects or movement of a user during operation of a radiotelephone may result in degraded signal quality or fluctuations in signal strength, known as multipath fading. Diversity antennas have been designed to work in conjunction with a radiotelephone's primary antenna to improve signal reception and overcome multipath fading.

Radiotelephones and other communication devices are also undergoing miniaturization. Indeed, many of the contemporary models are less than 11–12 centimeters in length. Unfortunately, as radiotelephones decrease in size, the amount of internal space therewithin may be reduced correspondingly. A reduced amount of internal space may make it difficult for both primary antennas and diversity antennas contained within a radiotelephone to achieve the bandwidth and gain requirements necessary for radiotelephone operation because their size may be correspondingly reduced.

Furthermore, it may be desirable for a radiotelephone antenna to be able to resonate over multiple frequency bands. For example, the Japanese Personal Digital Cellular (PDC) system utilizes two "receive" frequency bands and two "transmit" frequency bands. Unfortunately, the ability to provide antennas with adequate gain over multiple frequency bands may be presently limited because of size limitations imposed by radiotelephone miniaturization.

SUMMARY OF THE INVENTION

It is, therefore, an object of the present invention to provide antennas for communication devices, such as radiotelephones, that allow the communication devices to be worn and operated in close proximity to a user's body.

It is another object of the present invention to provide communication device antennas that can radiate in a predetermined direction within one or more frequency bands.

It is also an object of the present invention to provide reduced size primary and diversity antennas that may be enclosed within small communications devices, such as radiotelephones, yet have sufficient gain for proper operation within one or more frequency bands.

These and other objects of the present invention are provided by a dual-band antenna including first and second radiating elements configured to be enclosed within a communications device between the keypad and housing of the communications device such that the antenna is maintained in adjacent spaced-apart relationship with a circuit board underlying the keypad. Antennas according to the present invention may have a meandering configuration in order to occupy available space existing around the perimeter of a keypad and/or between the keys of a keypad.

The first and second radiating elements each face away from the circuit board, which serves as a ground plane for the antenna. The ground plane directs radiation from the antenna outwardly in a direction substantially normal to the circuit board. Accordingly, a communications device incorporating an antenna according to the present invention may be worn and operated in close proximity to a user's body. The second radiating element is parasitically coupled with the first radiating element and allows the antenna to resonate within a frequency band different from the first radiating element. A slot may be formed within the first radiating element to facilitate impedance matching of the antenna.

Antennas according to the present invention, whether used as diversity or primary antennas, may be advantageous because their size and configuration may allow them to fit within small internal confines of a radiotelephone, while providing adequate gain over one or more frequency bands. Antennas according to the present invention are particularly advantageous for communications devices such as radiotelephones that are worn by users or are operated within close proximity of a user.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
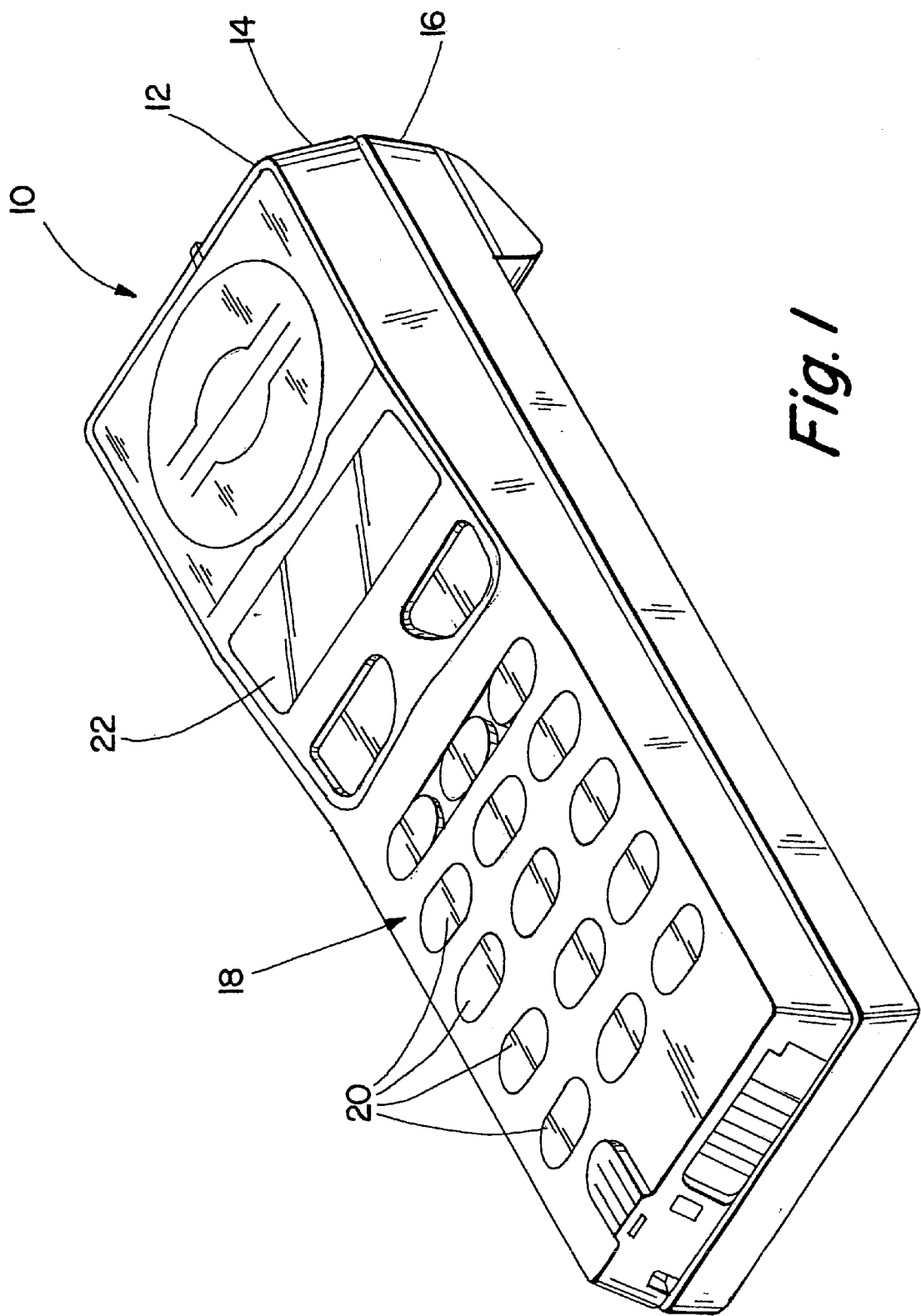
FIG. 1 illustrates a radiotelephone within which an antenna according to the present invention may be incorporated.

Referring now to FIG. 1, a radiotelephone 10 that may be worn around a user's waist or wrist, or carried in a user's pocket, is illustrated. The housing 12 of the illustrated radiotelephone 10 includes a top portion 14 and a bottom portion 16 connected thereto to form a cavity therein. Top and bottom housing portions 14, 16 house a keypad 18 including a plurality of keys 20, a display 22, and electronic components (not shown) that enable the radiotelephone 10 to transmit and receive radiotelephone communications signals. An antenna according to the present invention may be located within the illustrated radiotelephone 10, between the keypad 18 and the top housing 14.

Figure 2:
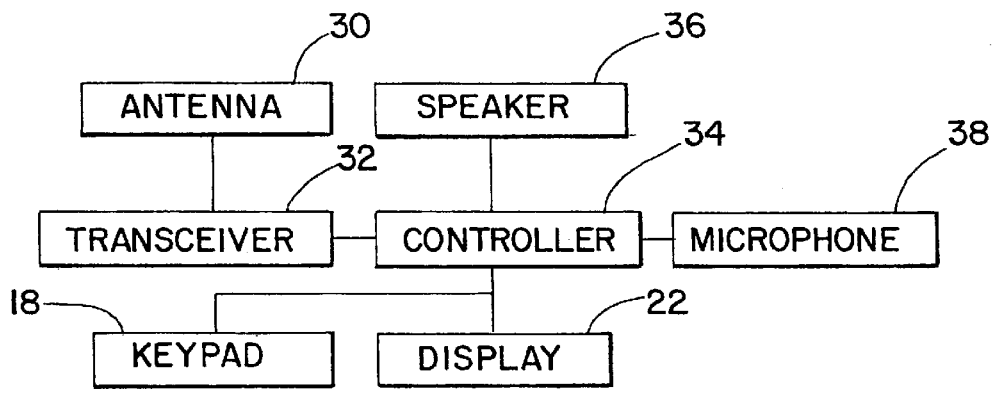
FIG. 2 is a schematic illustration of a conventional arrangement of electronic components for enabling a radiotelephone to transmit and receive telecommunications signals.

A conventional arrangement of electronic components that enable a radiotelephone to transmit and receive radiotelephone communication signals is shown schematically in FIG. 2, and is understood by those skilled in the art of radiotelephone communications. A primary antenna 30 for receiving and transmitting radiotelephone communication signals is electrically connected to a radio-frequency transceiver 32 that is further electrically connected to a controller 34, such as a microprocessor. The controller 34 is electrically connected to a speaker 36 that transmits a remote signal from the controller 34 to a user of a radiotelephone. The controller 34 is also electrically connected to a microphone 38 that receives a voice signal from a user and transmits the voice signal through the controller 34 and transceiver 32 to a remote device. The controller 34 is electrically connected to a keypad 18 and display 22 that facilitate radiotelephone operation.

As is known to those skilled in the art of communications devices, an antenna is a device for transmitting and/or receiving electrical signals. A transmitting antenna typically includes a feed assembly that induces or illuminates an aperture or reflecting surface to radiate an electromagnetic field. A receiving antenna typically includes an aperture or surface focusing an incident radiation field to a collecting feed, producing an electronic signal proportional to the incident radiation. The amount of power radiated from or received by an antenna depends on its aperture area and is described in terms of gain. Radiation patterns for antennas are often plotted using polar coordinates. Voltage Standing Wave Ratio (VSWR) relates to the impedance match of an antenna feed point with a feed line or transmission line of a communications device, such as a radiotelephone. To radiate radio frequency (RF) energy with minimum loss, or to pass along received RF energy to a radiotelephone receiver with minimum loss, the impedance of a radiotelephone antenna is conventionally matched to the impedance of a transmission line or feeder.

Conventional radiotelephones may employ a primary antenna which is electrically connected to a transceiver operably associated with a signal processing circuit positioned on an internally disposed printed circuit board. In order to maximize power transfer between a primary antenna and a transceiver, the transceiver and the antenna are preferably interconnected such that their respective impedances are substantially "matched," i.e., electrically tuned to filter out or compensate for undesired antenna impedance components to provide a 50 Ohm (Ω) (or desired) impedance value at the circuit feed.

As is well known to those skilled in the art of radiotelephones, a diversity antenna may be utilized in conjunction with a primary antenna within a radiotelephone to prevent calls from being dropped due to fluctuations in signal strength. Signal strength may vary as a result of a user moving between cells in a cellular telephone network, a user walking between buildings, interference from stationary objects, and the like. Diversity antennas are designed to pick up signals that a main antenna is unable to pick up through spatial, pattern, and polarization or gain diversity. Diversity antennas may also be utilized to offset Rayleigh fading, which may include sudden deep fades or losses of signal strength due to multipath phase cancellation.

Figure 3A:
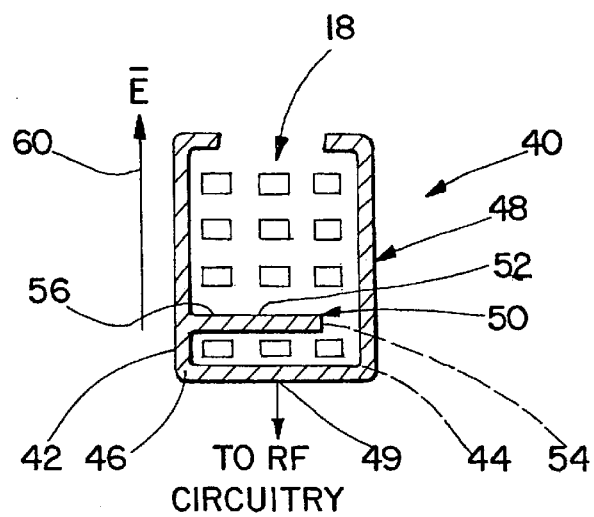
FIGS. 3A–3B illustrate aspects of a dual-band antenna according to an embodiment of the present invention.
Figure 3B:
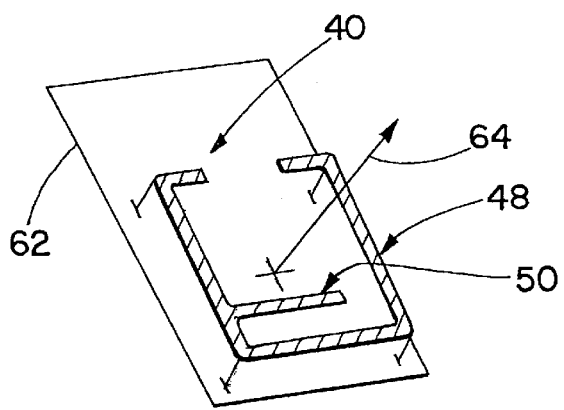

Referring now to FIGS. 3A–3B, a dual-band antenna 40 in accordance with a preferred embodiment of the present invention is illustrated. The illustrated antenna 40 may be utilized as a diversity antenna or as a primary antenna for a communications device, such as a radiotelephone. The illustrated antenna 40 includes a first dielectric substrate 42, such as a fiberglass circuit board, having a face 44 upon which conductive material 46 is applied to form a first radiating element 48. A feed point 49 is provided as illustrated, for electrically connecting the antenna 40 to RF circuitry within a radiotelephone.

A particularly preferable material for use as the dielectric substrate 42 is an FR4 board, which is well known to those having skill in the art of communications devices. However, various dielectric materials may be utilized for the dielectric substrate 42. Preferably, the dielectric substrate 42 has a dielectric constant between about 2 and about 4 for the illustrated embodiment. However, it is to be understood that dielectric substrates having different dielectric constants may be utilized without departing from the spirit and intent of the present invention. The radiating element 48 may also be molded directly into the non-conductive (plastic) front of the telephone thus eliminating the need for a dielectric substrate.

As illustrated, the first radiating element 48 is configured to extend around a portion of the perimeter of the keypad 18. The first radiating element is tuned to resonate at a first band of frequencies, such as 800 MHz. The E field vector 60 produced by the antenna 40 is orthogonal to the plane of the feed point 64 as illustrated in FIG. 3A.

Figure 3C:
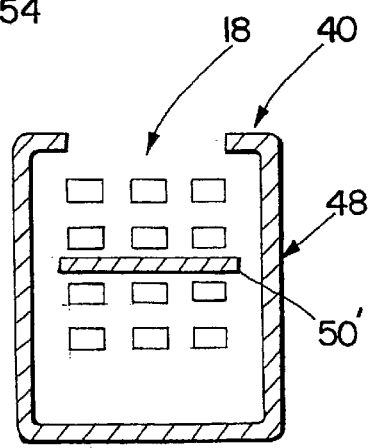
FIG. 3C illustrates a dual-band antenna having separate radiating elements according to another embodiment of the present invention.

The illustrated antenna 40 also includes a second radiating element 50. The second radiating element 50 is formed by applying a conductive material 52 onto a face 54 of a second dielectric substrate 56. In the illustrated embodiment of FIGS. 3A–3B, the second radiating element 50 is directly connected to the first element 48. However, it is to be understood that the second element 50 need not be directly connected to the first element 48. For example, a parasitic radiating element 50' may be formed from a substrate not connected to the first element 48 as illustrated in FIG. 3C.

As illustrated in FIGS. 3A–3B, the second radiating element 50 extends between adjacent rows of keys of the keypad 18. The second radiating element 50 is a parasitic radiating element that is configured to resonate at a frequency band different from the resonant frequency band of the first radiating element 48 (e.g., 1900 MHz). Accordingly, the first and second radiating elements 48, 50 provide dual-band functionality to the antenna 40. It is understood, however, that an antenna according to the present invention may be utilized as a single band antenna. Accordingly, only the first radiating element 48 would be necessary.

Referring now to FIG. 3B, the antenna 40 is illustrated as being spaced apart from an adjacent ground plane 62. The ground plane 62 allows the antenna 40 to achieve maximum radiation in a direction substantially normal to a plane defined by the ground plane 62. The direction of maximum radiation is indicated by arrow 64. As will be described below, the ground plane 62 may be a printed circuit board within a radiotelephone or other communications device incorporating aspects of the present invention.

Dimensions of the illustrated first and second radiating elements 48, 50 may vary depending on the space limitations within the keypad area of a radiotelephone or other communications device. Typically, the first and second dielectric substrates 42, 56 have a thickness of between 0.5 and 1.0 millimeters (mm). The width of the first and second dielectric substrates 42, 56 is a tuning parameter and may be between 2 and 6 mm. The electrical length of the first and second radiating elements 48, 50 is a tuning parameter, as is known to those skilled in the art. A preferred conductive material for application to the first and second dielectric substrates 42, 56 is copper tape. Typically, the thickness of the conductive material 46, 52 on the first and second dielectric substrates 42, 56 is between about 0.05–0.1 mm thick.

Figure 4:
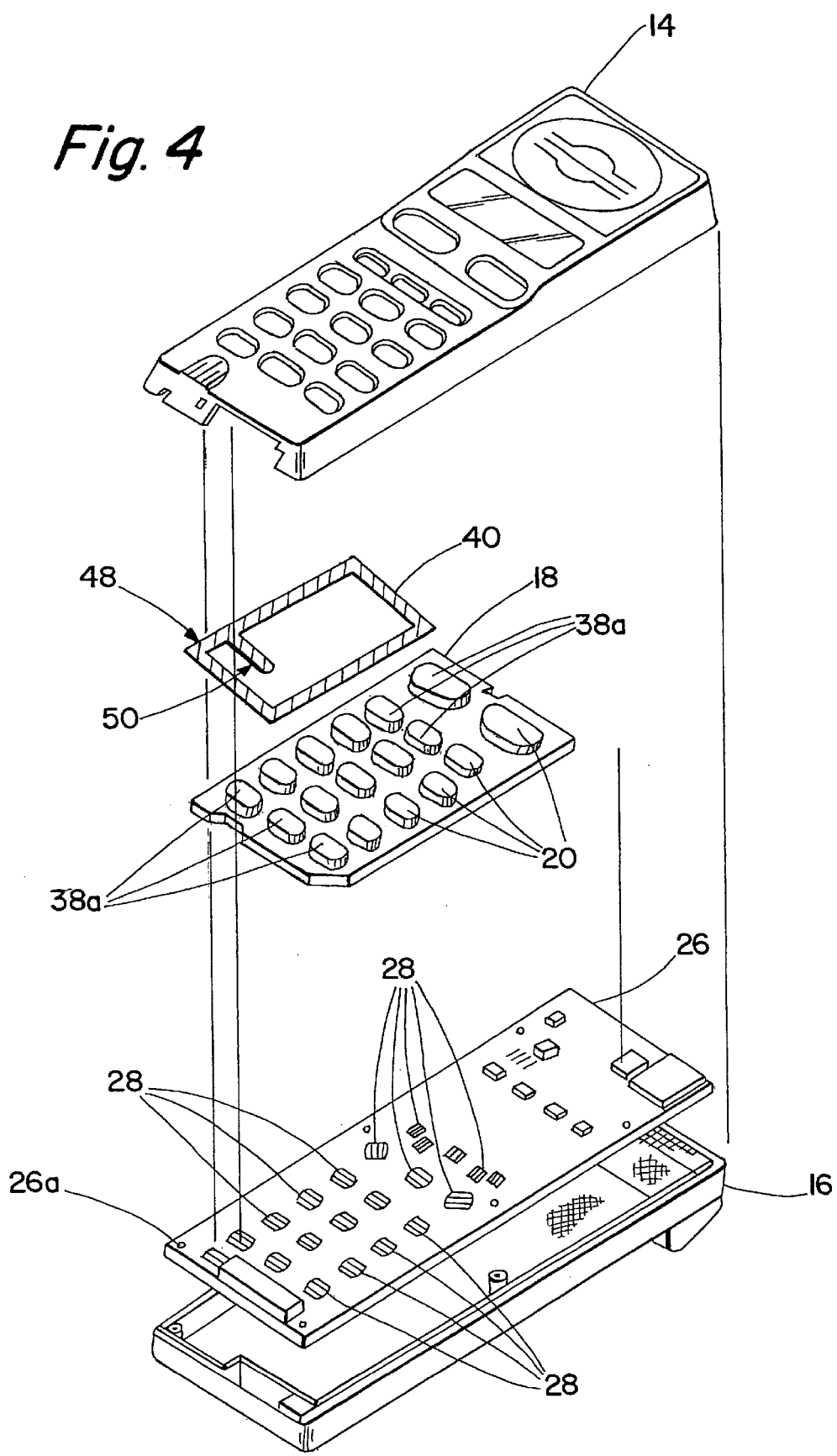
FIG. 4 illustrates an exploded perspective view of a radiotelephone incorporating an antenna according to the present invention.

Referring now to FIG. 4, an exploded perspective view is provided of a radiotelephone 10 incorporating a dual-band antenna 40, according to the present invention. Other illustrated components include a circuit board 26, and keypad 18. The illustrated circuit board includes a plurality of contact pads 28 located on a face 26a of the circuit board 26. The contact pads 28 are positioned so that a respective contact pad is positioned so that a respective key of the overlying keypad 18. The circuit board 26 serves as a ground plane for the antenna 40. The keypad maintains the antenna 40 in spaced apart, adjacent relationship with the ground plane (circuit board 26).

Still referring to FIG. 4, the illustrated keypad 18 overlies the circuit board 26 and includes a plurality of keys 20 arranged for user operation. Each illustrated key 20 has a first end 38a configured to extend through the top housing portion 14 for user access, and a second end (not shown) positioned to be operably engageable with a respective contact pad 28 on the circuit board face 26a. When a user presses a key 38, the second end of the key makes contact with a respective contact pad 28. The first radiating element 48 of the antenna 40 is configured to extend around a portion of the perimeter of the keypad 18. The second radiating element 50 is configured to extend between the first and second rows of keys 20 of the keypad 18.

Figure 5A:
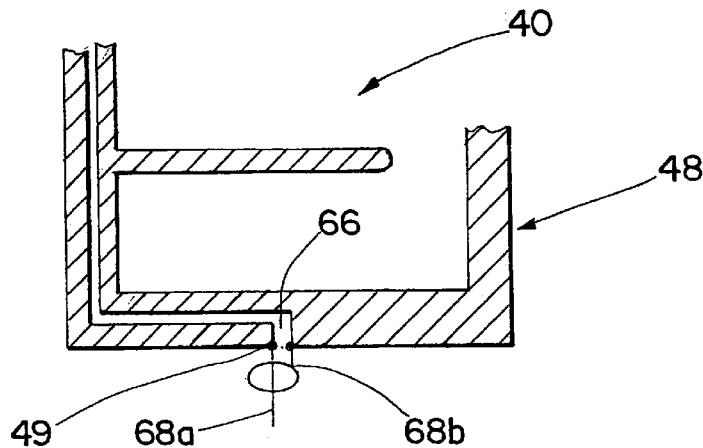
FIG. 5A illustrates an impedance matching slot formed in a portion of a radiating element of an antenna according to the present invention.
Figure 5B:
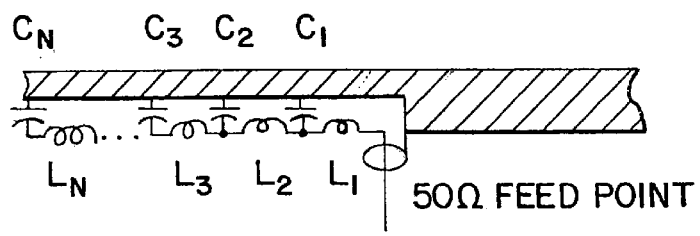
FIG. 5B is a schematic representation of the matching circuit caused by the impedance matching slot of FIG. 5A.

Referring now to FIGS. 5A–5B, an impedance matching slot 66 is formed in a portion of the first radiating element 48 of the antenna 40, beginning at the feed point 49, as illustrated. The impedance matching slot is not illustrated in FIGS. 3A–3B for clarity. A center conductor 68a and an outer conductor 68b of an antenna feed 68 are connected to respective portions of the first radiating element opposite the impedance matching slot 66. As would be understood by those skilled in the art of antennas, the center conductor 68a and outer conductor 68b may be electrically connected to the respective portions of the first radiating element 48 using solder, conductive adhesives, and the like. As is understood by those skilled in the art of radiotelephones, the conductors 68a, 68b connected to the antenna feed 49 provide a pathway for RF input and output to and from a radiotelephone transceiver.

It is desired to match the first radiating element 48 at the feed point 49 to a desired impedance value, such as 50 Ohm (Ω). This may be accomplished via the matching slot 66. The matching slot 66 provides the appearance of a gamma match but does not require a series capacitor to tune out the inductance of a conventional gamma match section. The impedance matching slot 66 need not have the bandwidth limitations that are inherent in a gamma match section. FIG. 5B illustrates a schematic representation of the matching circuit caused by the impedance matching slot 66. The bandwidth of the antenna 40 may be adjusted by changing the length of the impedance matching slot 66.

Figure 3D:
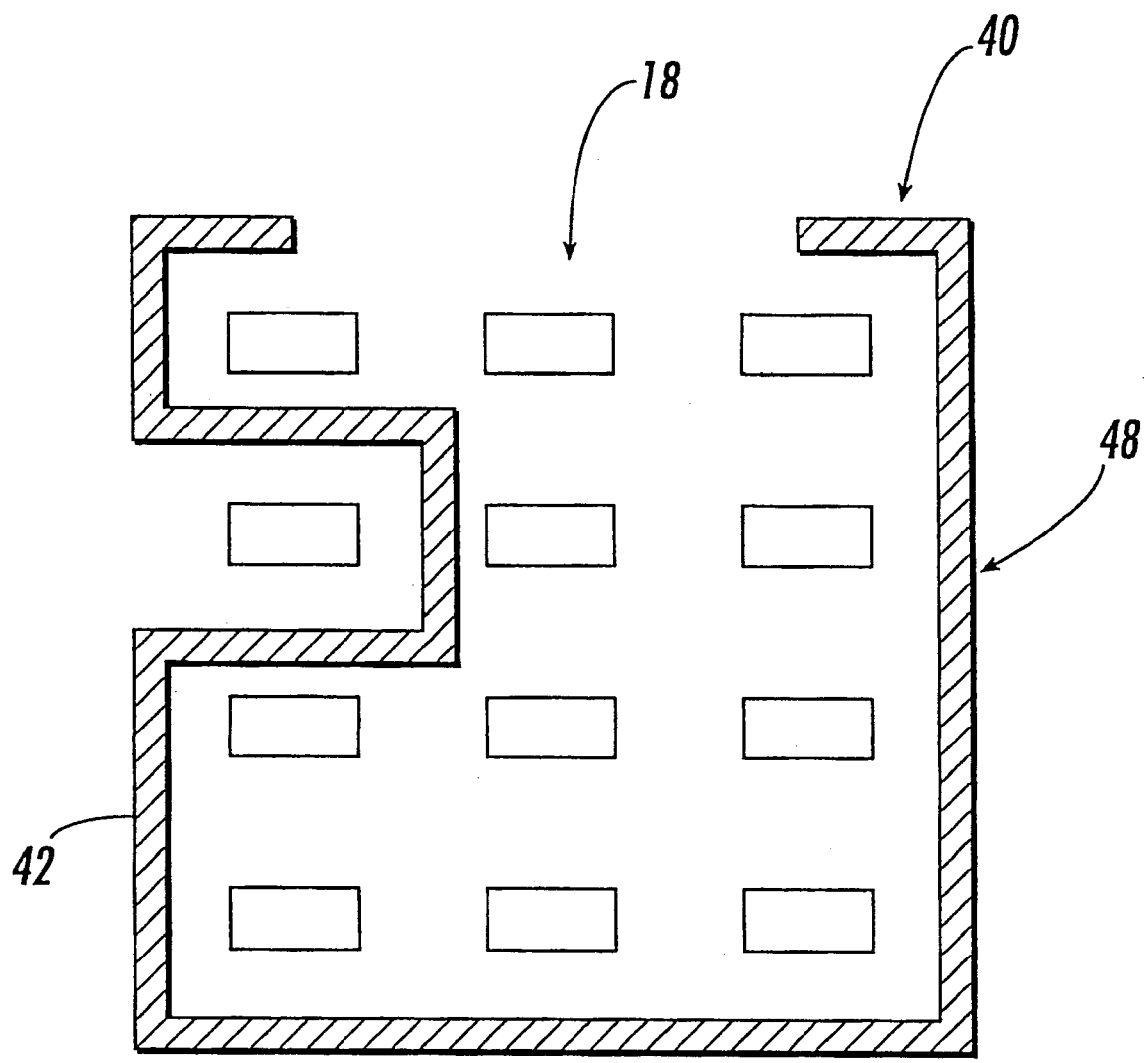
FIG. 3D illustrates a first radiating element of FIGS. 3A–3C that meanders through various keys of a keypad according to the present invention.

It is to be understood that the present invention is not limited to the embodiment illustrated in FIGS. 3A–3B and FIG. 5A. Various other configurations incorporating aspects of the present invention may be utilized, without limitation. For example, the first radiating element 48 may meander between various keys of a keypad as illustrated in FIG. 3D. The second radiating element 50 may be located in various other positions relative to the keys of the keypad 18. It is also understood that antennas according to the present invention may serve as diversity or primary antennas within communications devices such as radiotelephones.

Figure 6:
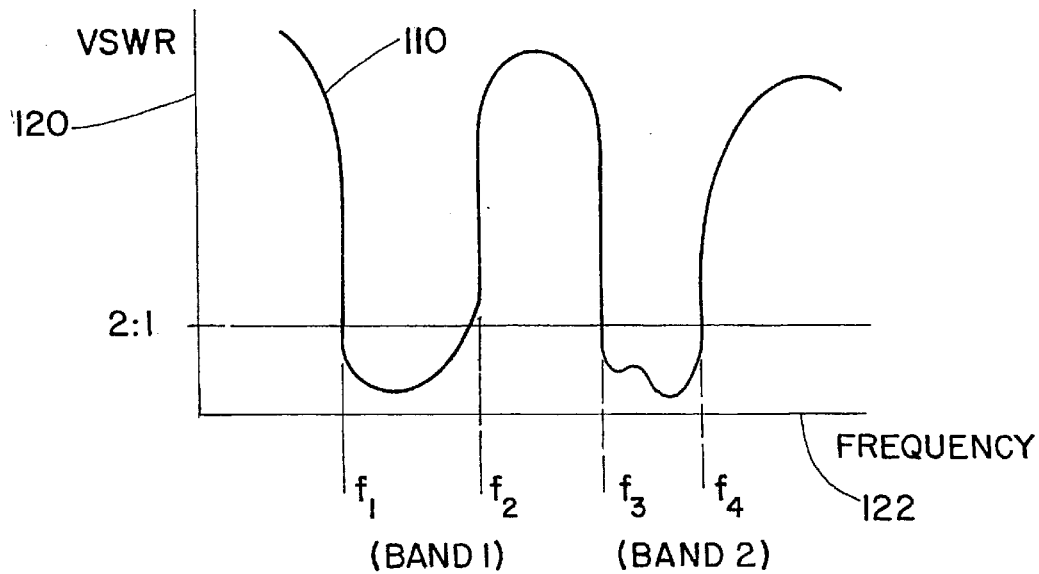
FIG. 6 is an exemplary resonance curve achievable by the antenna of FIGS. 3A–3B.

Referring now to FIG. 6, an exemplary resonance curve 110 achievable by the antenna 40 of FIGS. 3A–3B is illustrated. VSWR is plotted along the "Y" axis and is indicated as 120. Frequency is plotted along the "X" axis and is indicated as 122. As shown by the illustrated resonance curve 110, the first and second radiating elements 48, 50 of the antenna 40 are configured to resonate in two frequency bands (Band 1), (Band 2), respectively.

As illustrated, Band 1 extends from frequency $f_1$ to frequency $f_2$, and Band 2 extends from frequency $f_3$ to frequency $f_4$. For example, Band 1 may include the frequency of 800 MHz and Band 2 may include the frequency 1900 MHz. Preferably bands 1 and 2 are each below the 2:1 VSWR to facilitate impedance matching. The resonance curve 110 shows where (in frequency) a match between an antenna and the receiver circuit will result in 0.5 dB or less of loss. Accordingly antennas according to the present invention are particularly well suited for operation within various communications systems utilizing multiple frequency bands.

Antennas according to the present invention, when used as diversity antennas, are particularly well suited for combating both Rayleigh (line of sight and one main reflection) and Ricean (multiple reflections) fading. The present invention allows a diversity antenna to reside adjacent the keypad of a small mobile radiotelephone and helps when the primary antenna enters into a very large fade region or when it is desirable for the radiotelephone to function in other frequency bands.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A radiotelephone apparatus, comprising:
   a housing comprising top and bottom portions, said housing configured to enclose electronic components that transmit and receive radiotelephone communications signals;

a circuit board disposed within said housing, said circuit board comprising a plurality of contact pads on a face thereof;

a keypad comprising a plurality of keys, each key having a first end extending through said housing top portion and a second end operably engageable with a respective contact pad on said circuit board face;

an antenna between said keypad and said housing top portion, said antenna comprising:
   a first dielectric substrate comprising a surface that faces away from said circuit board;
   a first radiating element disposed on said first dielectric substrate surface, said first radiating element comprising a first electrically conductive path;
   a second dielectric substrate comprising a surface that faces away from said circuit board; and
   a second radiating element disposed on said second dielectric substrate surface and parasitically coupled with said first radiating element, said second radiating element comprising a second electrically conductive path.

2. A radiotelephone apparatus according to claim 1 wherein said second dielectric substrate and said second radiating element are connected to said first dielectric substrate and said first radiating element respectively.

3. A radiotelephone apparatus according to claim 1 wherein
   said second dielectric substrate and said second radiating element are spaced apart from said first dielectric substrate and said first radiating element.

4. A radiotelephone apparatus according to claim 1 wherein said first substrate extends around a portion of a perimeter of said keypad.

5. A radiotelephone apparatus according to claim 1 wherein said first substrate extends between two or more adjacent keypad keys.

6. A radiotelephone apparatus according to claim 1 wherein said second substrate extends between two or more adjacent keypad keys.

7. A radiotelephone apparatus according to claim 1 wherein said circuit board includes a ground plane for said antenna.

8. A radiotelephone according to claim 1 wherein said first and second electrically conductive paths have different electrical lengths.

9. A radiotelephone according to claim 1 wherein said first and second dielectric substrates have a dielectric constant between 2 and 4.

10. A radiotelephone according to claim 1 wherein said first and second radiating elements resonate within different frequency bands.

11. A radiotelephone apparatus according to claim 1 further comprising an impedance matching slot formed within said first radiating element.

12. An antenna, comprising:
   a ground plane;
   a meandering first dielectric substrate in adjacent spaced-apart relationship with said ground plane, said first dielectric substrate comprising a surface that faces away from said ground plane;
   a first radiating element disposed on said dielectric substrate surface, said first radiating element comprising a first electrically conductive path;
   a second dielectric substrate in adjacent spaced-apart relationship with said ground plane, said second dielectric substrate comprising a surface that faces away from said ground plane; and
   a second radiating element disposed on said second dielectric substrate surface and parasitically coupled with said first radiating element, said second radiating element comprising a second electrically conductive path.

13. An antenna according to claim 12 wherein said second dielectric substrate and said second radiating element are connected to said first dielectric substrate and said first radiating element respectively.

14. An antenna according to claim 12 wherein said second dielectric substrate and said second radiating element are spaced apart from said first dielectric substrate and said first radiating element.

15. An antenna according to claim 12 wherein said first and second electrically conductive paths have different electrical lengths.

16. An antenna according to claim 12 wherein said first radiating element includes an RF feed point.

17. An antenna according to claim 12 wherein said first and second dielectric substrates have a dielectric constant between 2 and 4.

18. An antenna according to claim 12 wherein said first and second radiating elements resonate within different frequency bands.

19. An antenna according to claim 12 further comprising an impedance matching slot formed within said first radiating element.

20. A dual-band antenna, comprising:
   a ground plane;
   a meandering first radiating element in adjacent spaced-apart relationship with said ground plane, wherein said first radiating element faces away from said ground plane, and wherein said first radiating element comprises a first electrically conductive path;
   a second radiating element parasitically coupled to said first radiating element, wherein said second radiating element faces away from said ground plane, and wherein said second radiating element comprises a second electrically conductive path; and
   an impedance matching slot formed within said first radiating element.

21. An antenna according to claim 20 wherein said first and second electrically conductive paths have different electrical lengths.

22. An antenna according to claim 20 wherein said impedance matching slot includes an RF feed point.

23. An antenna according to claim 20 wherein said first and second radiating elements are coplanar.

* * * * *

UNITED STATES PATENT AND TRADEMARK OFFICE
CERTIFICATE OF CORRECTION

PATENT NO.    : 6,016,126
DATED         : January 18, 2000
INVENTOR(S)   : Holshouser It is certified that error appears in the above-identified patent and that said Letters Patent is hereby corrected as shown below:

Column 5, line 27; please delete "so that" and insert - - beneath - -.

Signed and Sealed this

Eighth Day of May, 2001

Attest:

NICHOLAS P. GODICI

*Attesting Officer*      *Acting Director of the United States Patent and Trademark Office*